F. L. BENZON.
PANEL BOARD CONSTRUCTION.
APPLICATION FILED MAY 12, 1916.
1,248,603.
Patented Dec. 4, 1917.
2 SHEETS—SHEET 1.
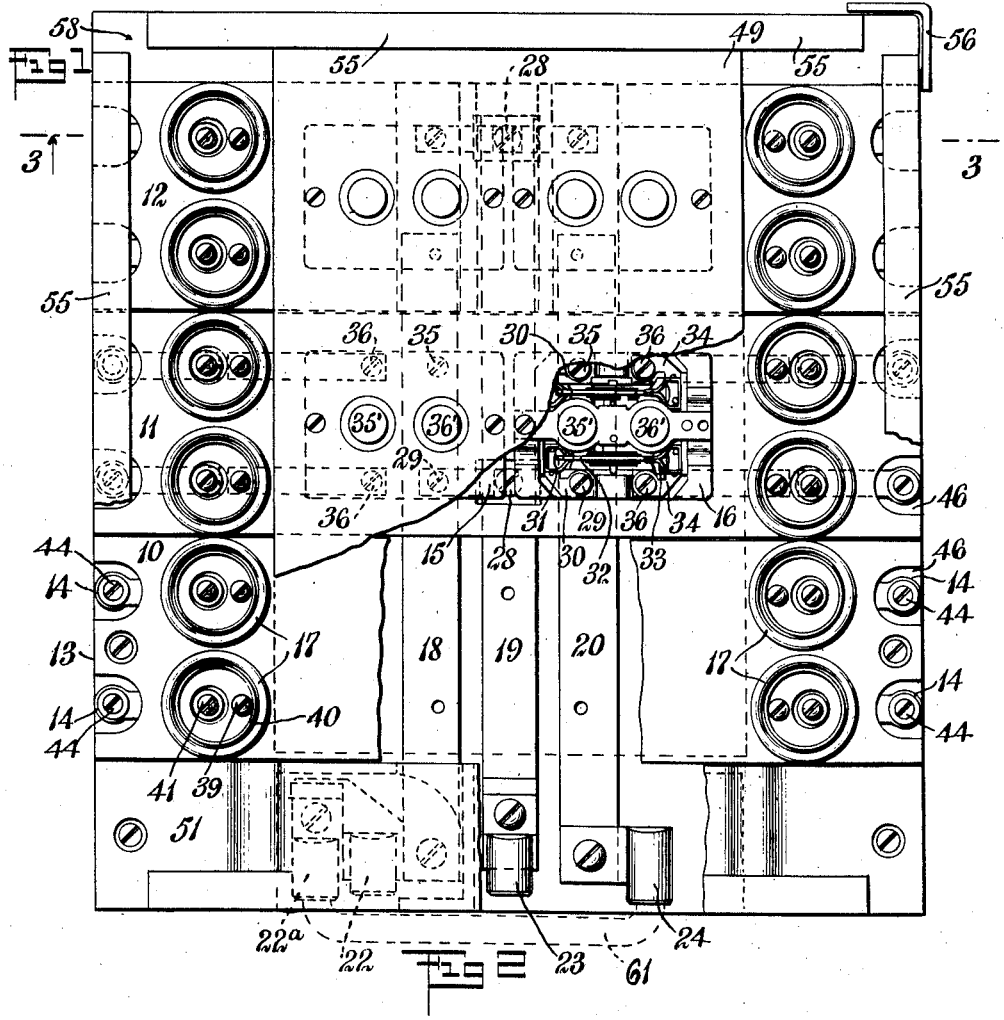
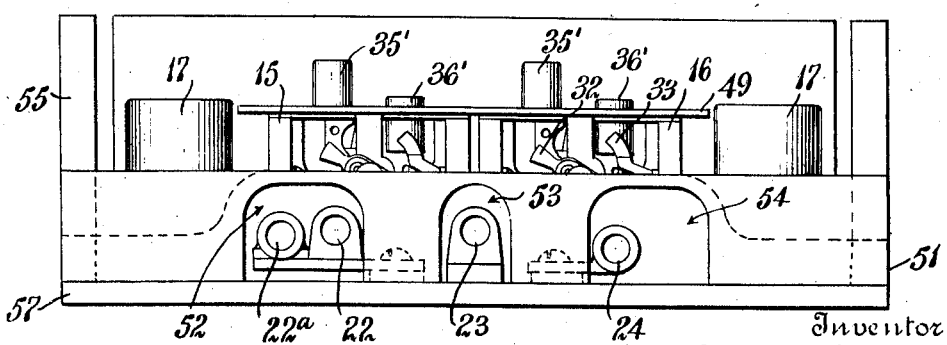
Inventor
Frederick L. Benzon
By his Attorneys F. L. BENZON.
PANEL BOARD CONSTRUCTION.
APPLICATION FILED MAY 12, 1916.
1,248,603.
Patented Dec. 4, 1917
2 SHEETS—SHEET 2.
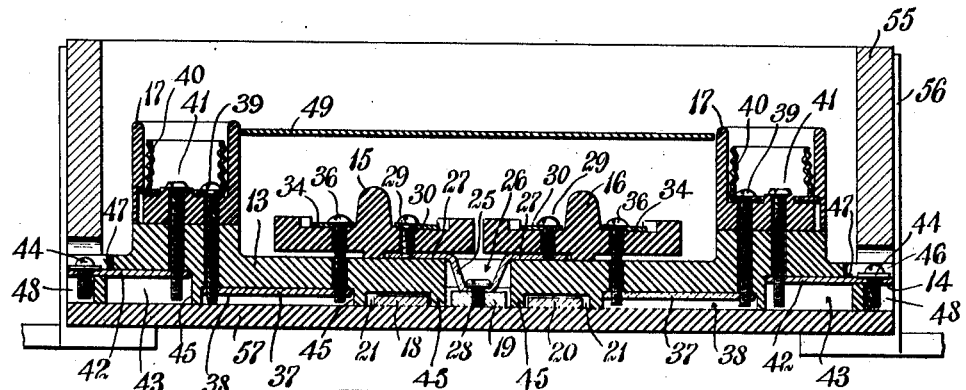
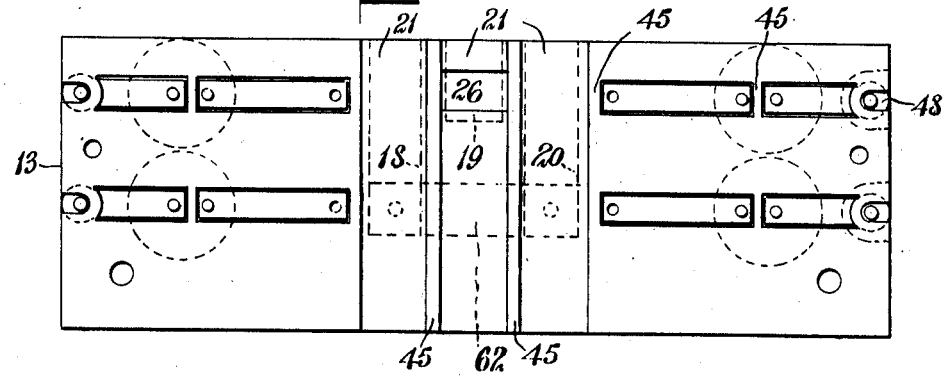
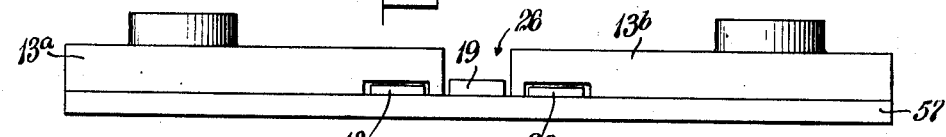
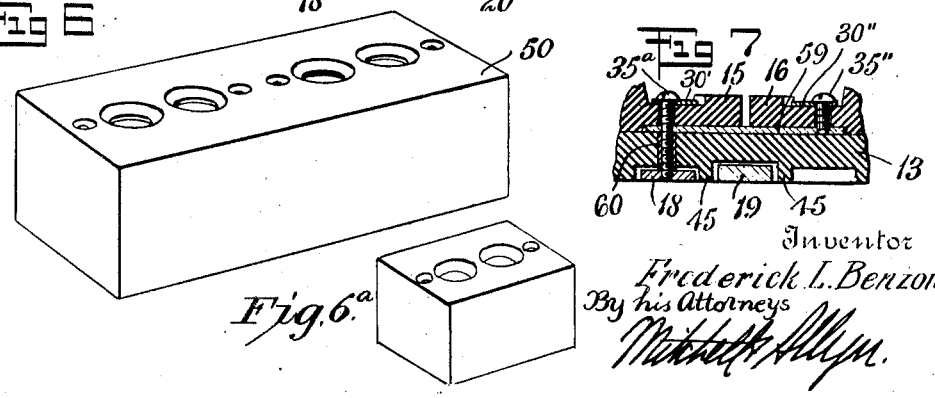
Inventor
Frederick L. Benzon
By his Attorneys

UNITED STATES PATENT OFFICE.

FREDERICK L. BENZON, OF PLAINVILLE, CONNECTICUT, ASSIGNOR TO THE TRUMBULL ELECTRIC MANUFACTURING COMPANY, OF PLAINVILLE, CONNECTICUT.

PANEL-BOARD CONSTRUCTION.

1,248,603.  Specification of Letters Patent.  Patented Dec. 4, 1917.

Application filed May 12, 1916. Serial No. 96,985.

*To all whom it may concern:*

Be it known that I, FREDERICK L. BENZON, a citizen of the United States of America, residing at Plainville, Connecticut, have invented a new and useful Panel-Board Construction, of which the following is a specification.

My present invention relates to panel boards, and the general objects of the invention are to provide a board made up of simply constructed panel sections which can be readily assembled to meet different requirements.

Special objects of the invention are to simplify the electrical connections and to thoroughly insulate and protect all current carrying parts.

Another object is to facilitate the assembling of the panel units or sections.

In the accomplishment of the foregoing and other objects, I employ panel sections having insulating bases supporting the current receiving devices and adapted to be assembled in edge to edge relation, the bases of the several units being secured in assembled relation by means of securing brackets secured to a bus bar extending vertically of the backs of the several units. A special feature of these securing brackets, is their utilization as a means for carrying current from the bus bar to which they are secured to the current receiving devices on the front of the insulating bases.

To adapt the panel boards to either two wire or three wire systems, I preferably employ three bus bars, the intermediate bar usually being the one to which the securing brackets are fastened and the bars at opposite sides of the same carrying current through suitable connections to the switches or other current receiving devices. In order that the same panel board may be used on either two wire or three wire systems, a "jumper" connection is provided for connecting the two outer bus bars when the panel is used on a two-wire system.

For ordinary distribution systems, the panel is made up with switches mounted on the central portion of each insulating base section connected with the bus bars, with fuse holders on the opposite end portions of the insulating bases connected with said switches and branch terminals on the ends of the bases connected with said fuse holders.

A special feature of this construction is the placing of all the electrical connections to these several parts on the back of the insulating bases. Another desirable feature is the back or base for the bus bars and units.

Other special features of the invention are an insulating cover section for the ends of the bus bars and the circuit terminals carried thereby and a base construction enabling a ready assemblage of the branch terminals.

Various other features of the invention will appear as the specification proceeds.

In the accompanying drawings, I have illustrated the invention embodied in practical and preferred forms, but I would have it understood that changes and modifications may be made without departing from the true spirit and scope of the invention.

In these drawings:

Figure 1 is a front view of a panel constructed in accordance with and embodying the invention, parts being broken away to show other parts beneath the same.

Fig. 2 is an end view looking at the lower or circuit terminal end of the panel.

Fig. 3 is a cross sectional view taken substantially on the plane of the line 3—3 of Fig. 1.

Fig. 4 is an underneath or bottom view of the upper panel section illustrating a modified form of cross connection for adapting the panel to a two wire system.

Fig. 5 is a view in side elevation of a two-part form of panel unit.

Fig. 6 is a perspective view of a form of switch cover for the individual panel unit.

Fig. 6ª is a perspective view of a single cover for individual switches.

Fig. 7, is a sectional view showing the preferred connection for two wire work.

The panel board illustrated is made up of three panel sections designated respectively 10, 11, and 12, each of said sections consisting of a base 13 of insulating material supporting branch terminals 14 at the opposite ends thereof and having mounted on opposite sides of its central portion the two switches 15 and 16 which are connected with fuse holders 17 interposed between said switches and the branch terminals or outlets. The switches shown are of the pushbutton type and the fuse holders are illustrated as screw sockets adapted to receive screw plug fuses but it will be understood that other forms and arrangements of switches and fuse holders may be used when desired.

Bus bars 18, 19 and 20 are provided extending along the backs of the panel bases and preferably seated in transversely extending grooves 21 formed therein, these bars being provided at their lower ends with terminals 22, 23 and 24 for the feed wires of a 3-wire system.

The panel bases are secured together in assembled relation by brackets of special construction formed as best indicated in Fig. 3 with loops or U-shaped portions 25 projecting through openings or recesses 26 in the insulating bases into engagement with the intermediate bus bar 19 and with laterally extending wing portions 27 overlying the insulating bases 13. These brackets may as shown be secured to the intermediate bus bar by screws 28 passed through the looped portions of the brackets.

These securing brackets are utilized also to carry current to the switches located at opposite sides of the same, the connections being made in the illustration by screws 29 passed down through the switch contacts or terminals 30 into engagement with the laterally extending wing portions 27 of the brackets. In the specific form of switch shown the switch contacts carry springs 31 with which the pole pieces 32 engage, the opposite ends of said pole pieces or bridging members engaging the spring fingers 33 carried by the contact plates 34. These switches will need no further description than to point out that as the pushbuttons 35', 36' are alternately operated the bridging piece will be rocked to alternately engage with and become disengaged from the switch contacts to thereby make and break the circuit.

The contact 30 at the other side of the switch is, as indicated in Fig. 1 connected by a screw 35 with the bus bar at that side of the intermediate bus bar where the particular switch is located. Thus the switch at the right hand illustrated in Fig. 1 is connected by the screw 35 with the right bus bar 20 and in a similar way the like contact on the left hand switch will be connected by a screw 35 with the left hand bus bar 18.

The contacts 34 carrying the fingers with which the movable pole pieces engage are connected by screws 36 with conducting bars 37 located in longitudinally extending channels 38 in the backs of the bases, and which bars are connected at their opposite outer ends by screws 39 with one of the contacts 40 of the fuse holders 17. The contact 40 is in the illustration the side or screw shell contact, and the other or center contact of this fuse holder is in the form of a head on the upper end of the screw 41 which extends down through the base into engagement with a conducting bar or strip 42 located in a channel 43 and formed at its outer end to constitute one of the branch terminals 14, said strip carrying a suitable binding device such as the binding screw 44.

The transversely extending channels or grooves 38 and 43 in which the connecting strips 37 and 42 are located, are preferably separated from the adjoining bus bars and from each other by insulating barriers, as indicated at 45 in Figs. 3 and 4.

From the foregoing, it will be clear that the switches at opposite sides of the center line of each base are connected respectively with the intermediate bus bar and with a bus bar at one side of said intermediate bar, and further, that when the switches are operated to complete the circuit the current flow will be from said bus bars through the connecting strips on the back of the base to the fuse sockets and from said fuse sockets to the branch terminals. All of said connections, it will be noted, are on the back of the insulating panel base and so are protected both electrically and mechanically.

The branch terminals are shown mounted in seats 46 on the upper edge portions at the ends of the panel bases, and passages 47 extend through from these seats to the strip receiving channels 43 in the under side of the bases. Notches 48 are preferably cut in the edge of the base extending into the terminal seats 46 aforesaid, to receive the lower end portions of the binding screws 44. With this construction it is unnecessary to unscrew the binding screws 44 before inserting the connecting strips 42 through the passages 47, said strips being simply inserted through said passages into position to be engaged by the screws 41 at the inner ends thereof, in which case the fully extended binding screws 44 fit into the notches formed in the edge of the base.

The switches are preferably covered to keep out the dust, etc. In Figs. 1 to 3 a simple cover 49 is shown covering all the switches, said cover being provided with proper openings for the switch operating means, in this case the pushbuttons. If desired however the switches may have individual covers, as shown in Fig. 6ª, or the two switches of a panel unit may be both housed in a single switch cover such as that shown at 50 in Fig. 6, in which openings are shown for two push button switches in tandem arrangement.

The feeder terminals are also preferably housed and protected, the means for this purpose consisting in the present disclosure of a cover section 51 of insulating material, fitting over the lower protruding ends of the bus bars, as indicated in Fig. 1, and provided with chambers 52, 53 and 54 therein receiving the terminals 22, 23 and 24 respectively. This cover section may be made of the same material as the insulating bases and preferably abuts against the edge of the lower panel base to form in effect a continuation of the same.

The assembled panel structure may be closed in at the sides by walls 55, braced at the corners by corner-angles 56 and the panel may be backed by a suitable backing 57 preferably of insulating material.

An upper section is shown at 58 in Fig. 1 alongside the base of the upper panel section, to provide a base extending up underneath the upper wall 55. The use of such a section may be avoided by making the upper panel section of a special width, as is the case of the panel section illustrated in Fig. 4.

Also instead of making the double ended bases in a single piece, such bases may be made in two parts, as indicated at 13ª—13ᵇ in Fig. 5. This panel section is the same as those already described except that as stated it is divided in two parts at the center.

The panel board disclosed, while adapted for use on a three wire system can be readily changed over for use on a two wire system by simply omitting one bar as shown in Fig. 7 and employing a conducting connecting member 59 between the base 13 and the switch bases 15 and 16. A conducting bushing or sleeve 60 is interposed between bus bar 18 and member 59. The screw 35ª connects the switch terminal 30' with the bar 18 and also binds or clamps the bushing 60 between bar 18 and member 59 and screw 35'' connects switch terminal 30'' with member 59. The two outer bus bars might be connected as illustrated in Fig. 1 by providing a jumper wire 61 connected with the terminal 24 and with an additional terminal 22ª carried by the first terminal 22.

This cross-connecting of the two outer bus bars for use on 2-wire systems may be accomplished also by the method illustrated in dotted lines in Fig. 4 wherein the two outer bus bars 18 and 20 are connected by a strap 62 extending across between the two bars, the middle bus bar 19 terminating short of this cross strap.

From the foregoing it will be apparent that the panel board of my invention is of simple, practical and sturdy construction, that all live parts are thoroughly protected and that the board may be readily made up to meet any requirements as to size and capacity.

What I claim is:—

1. A distributing panel construction comprising panel sections having insulating bases provided with openings therethrough, a bus bar at the back of said panel sections in line with said openings, substantially U-shaped brackets having the looped portions thereof extending through said openings to the bus bars at the back thereof and provided with laterally extending wing portions overlying the front of the insulating bases to thereby confine the panel sections to said bus bar and securing screws passed through the loops in said bracket into said bus bar.

2. A distributing panel construction comprising panel sections having insulating bases provided with openings therethrough, a bus bar at the back of said panel sections in line with said openings, substantially U-shaped brackets having the looped portions thereof extending through said openings to the bus bar at the back thereof and provided with laterally extending wing portions overlying the front of the insulating bases to thereby confine the panel sections to said bus bar, securing screws passed through the loops in said brackets into said bus bar, current receiving devices on the insulating bases overlying the laterally extending wings of the securing brackets and current carrying securing screws extending down through said current receiving devices into engagement with said laterally extending wing portions.

3. In a panel board construction, an intermediate and two side bus bars, an insulating backing at the rear of said bus bars, removable panel sections each comprising an insulating base fitting over the bus bars, two switches removably mounted on each of said insulating bases at opposite sides of the intermediate bus bar, means for removably securing said switches in place on the insulating base units including screws accessible from the front of the switches extending rearwardly into connection with the intermediate and side bus bars, branch terminals on each insulating base and fuse holders on each of the insulating bases.

4. A panel board construction comprising panel sections having insulating bases provided with openings therethrough, an intermediate bus bar extending across the back of said insulating bases in line with the openings therethrough, bus bars at the opposite sides of said intermediate bus bar, brackets having opposite end portions overlying the front of the insulating bases and intermediate loops extending in the openings of the bases to the intermediate bus bar on the back thereof, securing screws passing through the loops into engagement with the intermediate bus bar, current receiving devices on the front of the insulating bases at opposite sides of said brackets electrically connected with said brackets and with the bus bars at opposite sides of the intermediate bus bar.

5. A panel board construction comprising panel sections having insulating bases provided with openings therethrough, an intermediate bus bar extending across the back of said insulating bases in line with the openings therethrough, bus bars at the opposite sides of said intermediate bus bar, brackets having opposite end portions overlying the front of the insulating bases and intermediate loops extending in the opening of the bases to the intermediate bus bar on the back thereof, securing screws passing through the loops into engagement with the intermediate bar, switches on the front of the insulating bases at opposite sides of said brackets and securing screws extending from said switches into engagement with the overlying portions of said brackets and into engagement with the bus bars at the opposite sides of said intermediate bus bar respectively.

6. A panel board construction comprising panel sections having insulating bases provided with openings therethrough, an intermediate bus bar extending across the back of said insulating bases in line with the openings therethrough, bus bars at the opposite sides of said intermediate bus bar, brackets having opposite end portions overlying the front of the insulating bases and intermediate loops extending in the openings of the bases to the intermediate bus bar on the back thereof, securing screws passing through the openings into engagement with the intermediate bus bar, switches on the front of the insulating bases at opposite sides of said brackets, securing screws extending from said switches into engagement with the overlying portions of said brackets and into engagement with the bus bars at the opposite sides of said intermediate bus bar respectively, branch terminals at the opposite ends of the insulating bases, fuse holders on the front of the insulating bases interposed between the respective switches and the branch terminals on the ends of the bases and connections on the backs of the insulating bases from said switches to the fuse holding devices and from said fuse holding devices to the branch terminals.

7. In a panel board construction panel sections having insulating bases provided with transverse channels extending across the backs thereof and with longitudinally extending channels on the backs thereof separated from each other and from said transverse channels by insulating walls, bus bars seated in said transverse channels, conducting bars located in said separated longitudinally extending channels, independently removable switches on the front of the insulating bases, screws extending rearwardly from said switches into engagement with said bus bars and with the conducting bars in the longitudinal grooves closest to the bus bars, fuse holding devices on the front of the insulating bases, securing screws extending rearwardly from said fuse holding devices into engagement with the separated longitudinally extending conducting bars, and branch terminals on the outer ends of the outermost conducting bars.

8. In combination, insulating bases, a bus bar at the back of said insulating bases, brackets secured to said bus bar having portions overlying the front of said insulating bases to thereby secure said bases to said bus bar and switches disposed at opposite sides of the brackets and screws securing the individual switches to the overlying portions aforesaid of said brackets, a second bus bar at the back of said bases and screws individually securing some of said switches directly to said second bus bar.

9. A panel section comprising an insulating base having centrally separated portions and transverse bus bar receiving and longitudinal grooves in the back thereof, switches mounted on the front of said base at opposite sides of the centrally separated portions, a bracket having a portion extending rearwardly between the separated portions aforesaid to the bus bar groove at the rear of the base and having oppositely extending wings overlying the separated portions of the base, screws extending from said switches into engagement with the wings of said brackets and screws extending from said switches into engagement with the conducting strips on the back of the insulating base.

FREDERICK L. BENZON.